United States Patent [19]

Underwood et al.

[11] 4,301,060

[45] Nov. 17, 1981

[54] POLYVINYL CHLORIDE CONTAINING A FILLER

[75] Inventors: William S. Underwood, Maidenhead; Louis Bohm, London, both of England

[73] Assignee: Kestrel Chemicals Limited, Woodley, England

[21] Appl. No.: 74,769

[22] Filed: Sep. 11, 1979

Related U.S. Application Data

[63] Continuation-in-part of Ser. No. 42,451, May 25, 1979, abandoned.

[30] Foreign Application Priority Data

Aug. 11, 1977 [GB] United Kingdom ............... 33745/77
Dec. 12, 1977 [GB] United Kingdom ............... 51601/77
May 31, 1978 [GB] United Kingdom ............... 26090/78

[51] Int. Cl.$^3$ .............................................. C08K 3/36
[52] U.S. Cl. ................................ 260/42.49; 260/40 R; 260/42.46; 260/42.47; 260/42.52
[58] Field of Search ............... 260/42.49, 42.46, 42.27, 260/42.52, 42.47; 423/337; 106/288 B

[56] References Cited

U.S. PATENT DOCUMENTS

| | | | |
|---|---|---|---|
| 2,573,057 | 10/1951 | Porter | 423/337 |
| 2,892,730 | 6/1959 | Kloepfer et al. | 260/42.49 X |
| 3,311,451 | 3/1967 | Biegler et al. | 423/337 |
| 3,485,790 | 12/1969 | Potter et al. | 260/42.52 |
| 3,525,689 | 8/1970 | Marotta | 260/42.49 X |
| 3,674,430 | 7/1971 | Illigen et al. | 106/288 B |
| 3,725,311 | 4/1973 | Grubb | 260/42.52 |
| 3,919,358 | 11/1975 | Batiuk et al. | 260/42.47 |
| 3,941,859 | 3/1976 | Batiuk et al. | 260/42.47 |
| 3,951,907 | 4/1976 | Mehta | 260/42.49 |
| 4,078,020 | 3/1978 | Rose et al. | 260/42.47 |
| 4,085,087 | 4/1978 | Kratel et al. | 260/42.49 |
| 4,151,137 | 4/1979 | Duvdevani et al. | 260/42.47 |

FOREIGN PATENT DOCUMENTS

589636 6/1947 United Kingdom .

*Primary Examiner*—Lewis T. Jacobs
*Attorney, Agent, or Firm*—Cushman, Darby & Cushman

[57] ABSTRACT

A solid resin composition comprises thermoplastic resin (for example polyvinyl chloride, especially unplasticized (PVC)) and, as a filler, a particulate amorphous silica that has been obtained by a process in which silica is reduced and the reduction product is oxidized in the vapor phase to form silica. A preferred silica is obtained as by-product in the production of silicon metal or ferrosilicon in a reduction furnace. The filler can be used at loadings as high as 250, preferably up to 150, parts per hundred parts of resin. Artifacts formed from the compositions, for example by extrusion or moulding, include pipes, conduits, gutters and soles for footwear.

20 Claims, No Drawings

POLYVINYL CHLORIDE CONTAINING A FILLER

This application is a continuation-in-part of application Ser. No. 42,451, filed May 25, 1979, and now abandoned.

FIELD OF THE INVENTION

The present invention relates to thermoplastic resin compositions, especially to polyvinyl chloride compositions, which contain, as a filler, a particular type of silica; it also relates to artifacts when formed from such a composition.

BACKGROUND OF THE INVENTION

Thermoplastic resins are a staple commercial product. Polyvinyl chloride (PVC), for example, finds use in such varied applications as flexible films and sheets, rigid foils and sheets, bottles and other containers, records, rigid extrusions such as pipes and conduits, cables, flooring materials, coatings for fabrics and for paper, and footwear. The PVC normally contains a filler in such applications.

One application of plasticized PVC is as an electrical insulation. Normally, a mixture of fillers will be used, for example a mixture of whiting, which is a low-cost filler, and a filler designed to impart the required electrical properties, such as calcined china clay (which is considerably more expensive than whiting).

Unplasticized PVC (UPVC) is now widely used to make rain-water products, such as pipes and guttering, as it is relatively cheap, light and corrosion resistant. UPVC is also used to manufacture pressure pipes, soil systems, drainage systems, ducts and conduits.

The UPVC will normally contain the following additives:

(a) a thermal stabilizer, usually a basic lead or tin salt;

(b) an internal lubricant (usually a wax of low melting point) to assist the PVC powder to absorb heat uniformly in the early zones of the extruder (i.e., to reduce melt viscosity);

(c) an external lubricant (usually a stearic acid ester) to assist the passing of melt through the die of the extruder;

(d) an impact modifier, especially for cold service conditions;

(e) a pigment (for example a mixture of carbon black and titanium oxide to produce a grey colour); and (f) a filler (usually calcium carbonate, e.g. precipitated calcium carbonate (PCC)) principally to cheapen the compound. However, an important exception is in UPVC for use in pressure pipes; here, the use of a filler is usually avoided in order to prevent deterioration of the properties of the UPVC.

The nature of the filler (particle size and shape and its chemical constitution) is of importance in that it can affect such properties of the finished product as degree of gloss, air entrapment, permeability, fire resistance, chemical properties (e.g. resistance to acids and alkalis), ageing characteristics, mechanical properties (tensile strength, elongation, hardness, brittleness and the like), dimensional properties (e.g. creep and shrinkage) and processing characteristics.

The filler commonly used hitherto (calcium carbonate, which may be coated with stearic acid) is not without disadvantages. For example, it cannot, in general, be used in amounts greater than 10 phr (parts per hundred parts of resin), otherwise the acid resistance and brittleness of the finished product would be unacceptable.

In general, an increase in the amount of a conventional filler in PVC results in an increase in hardness, brittleness and level of water absorption and a decrease in chemical resistance. This degradation of properties can become apparent even at levels below 10 phr. The deterioration of properties can be so marked, as the level of filler is increased, that loadings as high as 15 phr would not generally be contemplated—except possibly with the addition of expensive adjuvants—in UPVC of good quality.

Furthermore, particulate calcium carbonate, as well as being difficult to handle in bulk can result in poor flowability in the filled resin which results in a tendency to clog the orifices of the extrusion apparatus. Thus, appreciable amounts of lubricant are required.

Moreover, the conditions for the processing of prior-art UPVC compositions are such that a heat stabilizer is required. The stabilizers used hitherto tend to be toxic; it would therefore be desirable to formulate UPVC compositions with a reduced amount of stabilizer.

SUMMARY OF THE INVENTION

The present invention now provides a solid resin composition suitable for forming into artifacts, characterized in that it contains a thermoplastic resin and, as a filler, particulate, amorphous silica, which silica is obtained by a process in which silica is reduced and the reduction product is oxidised in the vapour phase to form silica (which particulate amorphous silica is also referred to hereinafter, for convenience, as the "present amorphous silica").

The term "filler" herein also includes an extender, when applied to the present invention.

The expression "thermoplastic resin" herein includes not only a thermoplastic resin per se, but also a mixture thereof, as well as a blend of a thermoplastic resin with another material, e.g. an elastomer, for instance a nitrile rubber. The so-called thermoplastic rubbers (thermo-elastomers) and also included since, as they include elastomeric domains and thermoplastic domains in the same polymer, they can be regarded as an "internal blend" of a thermoplastic resin and an elastomer. Despite their name, the thermoplastic rubbers are to be regarded as plastics rather than rubbers as such, since no vulcanization is used in their manufacture.

Thermoplastic resins include polyolefins, polystyrene, polyesters, ABS copolymers and acrylic polymers. However, a preferred resin for use in this invention is PVC, especially rigid, unplasticized PVC (UPVC). Accordingly, the invention will be hereinafter discussed primarily with reference to PVC, although this should not be construed as implying a limitation to the applicability of the invention.

It has been found that the use of the present amorphous silica as a filler in thermoplastic resins, e.g. PVC and especially UPVC, results in the obviation or substantial alleviation of various disadvantages associated with the prior-art fillers. In particular, compared with conventional fillers at the same loadings in PVC, in particular UPVC, the present amorphous silica results in higher impact strength and lower brittleness. Also, the present amorphous silica can be used at higher than conventional loadings whilst maintaining a high impact strength and low brittleness, without impairing other properties. For example, the chemical resistance remains good and the water absorption is low. It has also been found that the present amorphous silica does not degrade the flowability of the PVC composition and can assist processability. Furthermore, the present amorphous silica has a high thermal conductivity which can improve the rheological properties with a lower heat imput. The resulting reduction in the cycle time may result in the need for less stabilizer. Moreover, the present amorphous silica, when used as a filler in PVC, can result in an improved surface finish and an improved fire resistance, together with greater resistance to acid.

It will be appreciated that the ability to use large amounts of filler without impairing the quality of the PVC is of great commercial advantage since the filler, being far cheaper than the PVC, will reduce the cost of the finished product. In other words, the present amorphous silica is advantageously used not merely as a filler but also as an extender, that is to replace part of the resin, thereby saving costs.

In general, the higher the molecular weight of the PVC, the better the properties. The use of the present silica may enable a PVC of higher-than-usual molecular weight to be used for any given application.

DESCRIPTION OF PREFERRED EMBODIMENTS

(I) The amorphous silica

An amorphous silica that is eminently suitable for use in the present invention is obtained as a by-product in the production of silicon metal or ferrosilicon in electric reduction furnaces. In these processes, fairly large quantities of silica are formed as dust which is recovered in filters or other collection apparatus. Such silica can be obtained from Elkem-Spigerverket A/S, Norway.

The analyses and physical data for typical samples of silica of this description are given in the following tables:

TABLE 1

| Dust collected in bag filter from production of Si-Metal: | |
|---|---|
| Component | % by weight |
| $SiO_2$ | 94–98 |
| SiC | 0.2–0.7 |
| $Fe_2O_3$ | 0.05–0.15 |
| $TiO_2$ | 0.01–0.02 |
| $Al_2O_3$ | 0.1–0.3 |
| MgO | 0.2–0.8 |
| CaO | 0.1–0.3 |
| $Na_2O$ | 0.3–0.5 |
| $K_2O$ | 0.2–0.6 |
| Mn | 0.003–0.01 |
| Cu | 0.002–0.005 |
| Zn | 0.005–0.01 |
| Ni | 0.001–0.002 |
| S | 0.1–0.3 |
| C | 0.2–1.0 |
| P | 0.03–0.06 |
| Ignition loss (1000° C.) | 0.8–1.5 |
| Bunk density, from bunker, g/l | 200–300 |
| Bulk density, compacted, g/l | 700 |
| Real density, g/cm³ | 2.20–2.25 |
| Specific surface, m²/g | 18–22 |
| Particle size, percentage <1 μm | 90 |

TABLE 2

| Dust collected in bag filter from production of 75% FeSi: | |
|---|---|
| Component | % by weight |
| $SiO_2$ | 86–90 |
| SiC | 0.1–0.4 |
| $Fe_2O_3$ | 0.3–0.9 |
| $TiO_2$ | 0.02–0.06 |
| $Al_2O_3$ | 0.2–0.6 |
| MgO | 2.5–3.5 |
| CaO | 0.2–0.5 |
| $Na_2O$ | 0.9–1.8 |
| $K_2O$ | 2.5–3.5 |
| Mn | — |
| Cu | — |
| Zn | — |
| Ni | — |
| S | 0.2–0.4 |
| C | 0.8–2.0 |
| P | 0.03–0.08 |
| Ignition loss (1000° C.) | 2.4–4.0 |
| Bulk density, from bunker, g/l | 200–300 |
| Bulk density, compacted, g/l | 700 |
| Real density, g/cm³ | 2.20–2.25 |
| Specific surface, m²G | 18–22 |
| Particle size, percentage <1 μm | 60 |

Amorphous silica of the above type can be obtained from other manufacturers of Si and FeSi, for example, the manufacture of silicon involves the reduction of silica (coarse, silica, e.g. quartz) with carbon. Iron is added if the alloy ferrosilicon is to be manufactured. Part of the product of this reduction of silica may be re-oxidised in the vapour phase with oxygen (e.g. in air) to form the fine, particulate silica that is useful herein.

It is possible to obtain the amorphous silica not as a by-product but as the major product, by appropriately adjusting the reaction conditions.

The amorphous silica used in the present invention is composed substantially of sub-micron, spherical, substantially non-aggregated particles. The regular spherical shape and relatively narrow particle-size range, together with its hardness, chemical inertness and lack of porosity, render the amorphous silica surprisingly useful herein.

For example, the amorphous silica particles may consist of at least 86% by weight of $SiO_2$, will have a real density of 2.20–2.25 g/cm³ and will have a specific surface area of 18–22 m²/g, the particles being substantially spherical, and wherein at least 60% by weight of the particles have a particle size of less than 1 micron. Of course, variation of these values is readily possible. For example, the silica may have a lower $SiO_2$ content. Moreover, the particle size distribution can be adjusted; thus, it is possible to remove coarser particles, as by centrifuging.

The present amorphous silica may be grey in colour owing to a content of carbon. However, this carbon can be burnt off, e.g. at temperatures of above 500° C. It is also possible so to modify the silicon and ferrosilicon manufacturing processes as to obtain the silica in a comparatively white form which is otherwise virtually identical with the grey silica normally produced. Essentially, the process modification consists of reducing the amount of coal in, or eliminating coal from, the charge. The other consequence of this modification is a change in the proportion of silica produced to the amount of silicon or ferrosilicon; in other words the ratio of silica to silicon or ferrosilicon is higher in the modified process.

It will be appreciated with the use of the above-mentioned white amorphous silica can obviate the need for an additional white pigment. However, the use of the grey silica in conjunction with a white pigment is not excluded.

Thus, 3 phr of $TiO_2$ will give a good light base colour, thereby permitting the use of other pigments to achieve the required hue. Of course, a dark pigment (e.g. carbon black) could be used instead, if a dark-coloured PVC blend is required. In many applications, however, the grey colour that may be imparted to the resin by the present amorphous silica is acceptable or even preferred, as in the case of PVC pipes, thereby avoiding the use of a pigment altogether and thus saving costs.

It will be appreciated that the present amorphous silica, inasmuch as it can be obtained as a by-product, can be obtained comparatively inexpensively. As indicated in Tables 1 and 2, the present amorphous silica can be compacted. The use of the compacted silica will give a saving in transport and handling costs.

(II) Processing

It is a further advantage of the present amorphous silica that its inclusion as a filler in UPVC can be effected using any of the conventional techniques and apparatus. For optimum results it is important that the present amorphous silica be thoroughly mixed in with the resin, in order to obtain a homogeneous dispersion. On a laboratory scale, melt mixing has proved a useful technique. However, on an industrial scale, good mixing may be achieved in a compounding extruder. Alternatively, efficient methods of dry blending could be used, especially when the composition is to be extruded on a large, commercial (twin-screw) extruder. Also, where spray-drying is used to form PVC or other resin powder, the silica could be added at that stage to achieve fine mixing.

By means of routine experimentation, the processer can determine (a) the appropriate conditions for achieving a good dispersion and (b) the optimum amount of the present amorphous silica for any given application; as outlined above, the processer may well find that he needs lower proportions of thermal stabilizer, lubricant or white pigment. In fact, better processability has been experienced using the present amorphous silica than has been the case with PCC.

(III) Specific examples

The materials used in the following examples were as follows:

PVC-"Breon S125/12", which is a high-molecular-weight PVC supplied by B.P. Chemicals Limited.

Stabilizer-"EL74", a stabilizer supplied by Akzo Chemie NV, Holland.

Conventional filler-"Winnofil S", which is a surface-treated, precipitated calcium carbonate, supplied by I.C.I. Limited.

Present amorphous silica-"Kestrel 600".

Kestrel 600 is a particulate silica obtained as a by-product in the production of silicon metal in an electric reduction furnace. The silica is non-toxic, amorphous and non-hygroscopic, and has spherical particles and a very low moisture content. Typical physical properties are:

| | |
|---|---|
| Average particle size | 0.15 microns |
| Colour | Grey |
| S.G. (20/20° C.) | 2.2 |
| $SiO_2$ content | over 94% by weight |
| Moisture content | max. 0.7% by weight |
| pH (2% slurry in 50% $CH_3OH$, 50% $H_2O$ mixture) | approx. 7.5 |
| Bulk density | 200/300 gms per liter |

In order to examine the properties of the present amorphous silica as a filler in unplasticized PVC, the following test formulations were prepared (the figures being parts by weight):

TABLE 3

| Component | Formulation | | |
|---|---|---|---|
| | A | B | C |
| Breon S125/12 | 100 | 90 | 90 |
| Kestrel 600 | — | — | 10 |
| Winnofil S | — | 10 | — |
| Stabilizer | 3 | 3 | 3 |

Formulations were prepared using both a high speed and a melt-mixing technique, as follows:

(i) High-speed mixing of each of the three blends was effected in a Steele & Colishaw high-speed mixer. The chamber of the vessel was preheated to 60° C. and the components were then added; mixing was continued until a temperature of 120° C. was recorded and the blend was then dumped and cooled. The rotational speed, motor current and mix temperature were monitored: no significant difference could be found in the behavior of the two fillers used in formulations B and C.

(ii) Melt mixing was effected on a Planters two-roll mill. The front roll was set at 175° C. and the back roll was set at 155° C., the roll speeds being 30 rpm at the front and 25 rpm at the back. The formulation containing the present amorphous silica, namely formulation C, proved to be the easiest of the three to handle and showed no tendency to stick to the rolls.

Thin sheet moulding

A chromium-plated picture-frame mould was used which gave a sheet size of 150×150×1.5 mm. An appropriately sized piece of the mill-mixed formulation was placed in the cavity of this mould and the assembly was then loaded in a press which had been set to give a temperature of 170° C. Light pressure was applied and after 15 minutes a moulding pressure of 0.5 tsi was applied. The mould was then cooled in the press and the sheet removed. Good quality sheets were obtained with all three formulations.

Tensile tests

Small dumb-bell-shaped samples, whose bar portion was 30 mm×3.7 mm, were cut from from thin, compression moulded sheets of each formulation as described above. In order to prevent edge damage, the sheet and cutter were put in an oven at 100° C. for a few minutes before cutting each sample.

For each formulation, three samples were cut with their long axis parallel to the mill grain direction (the samples having been milled before moulding) and three were cut with their long axis perpendicular to the mill grain direction.

Tensile tests were carried out on an Instron tester using a 0–500 Newton load cell. Cross head speed was 5 mm per minute. The elongation of the sample was estimated from the cross head movement on the assumption that all deformation occurred in the 30 mm gauge section. The test temperature was 21°-22° C.

The results obtained are as follows:

TABLE 4

|  | Formulation | | |
|---|---|---|---|
|  | A | B | C |
| Tensile Modulus (MN/m$^2$) | 1270 | 1410 | 1250 |
| Yield Stress (MN/m$^2$) | 59.5 | 49.6 | 51.1 |
| Elongation at Yield (%) | 8.1 | 7.3 | 7.8 |
| Breaking Stress (MN/m$^2$) | 51.0 | 45.7 | 52.8 |
| Elongation at Break (%) | 83 | 74 | 101 |

Impact tests

Impact tests were carried out using a Ceast testing machine. In this test, a bar-shaped sample is supported with its long axis horizontal by resting each end on supports. The sample is positioned against two vertical stops 50 mm apart. The sample is struck horizontally by a weighted pendulum at the point midway between the stops. The sample should be broken by the pendulum below; the energy absorbed in breaking the sample is measured by the reduction in the swing of the pendulum. This energy is used as a measure of the impact resistance of the sample.

In the Ceast testing machine a force-measuring transducer fitted into the pendulum weight is connected to an oscilloscope and gives a trace of force against time during the failure of the sample.

The samples were strips 6 mm wide cut from compression moulded sheets about 1.4 mm in thickness. The samples had each been moulded from one layer of milled PVC. Samples were cut either parallel or perpendicular to the mill grain.

The test was so carried out that the force was applied to the 1.4 mm thick face. Three tests were made on samples cut "parallel to grain" and three on the samples cut "perpendicular to grain", for each formulation.

The results are summarized below:

TABLE 5

| Formulation | Grain Direction | Failures on impact (out of 3 test samples) | Impact Energy for failed samples |
|---|---|---|---|
| A | Parallel | 2 broken | 0.37 J |
| A | perpendicular | 2 broken | 0.15 J |
| B | Parallel | 3 broken | 0.22 J |
| B | perpendicular | 2 broken | 0.51 J |
| C | parallel | 3 bent | 1.08 J |
| C | perpendicular | no failures | — |

Tensile and impact tests indicate that the formulation containing the present amorphous silica as a filler has improved mechanical properties, compared to the unfilled PVC and PVC filled according to the prior art. Thus, the PVC with the present amorphous silica as the filler has lower brittleness (expressed by a higher elongation at break), higher breaking stress and higher impact strength than the conventional filled PVC.

Vicat softening point

The results were as follows:

| Formulation A | 87° C. |
|---|---|
| Formulation B | 106° C. |
| Formulation C | 105° C. |

Thus, the use of the present amorphous silica as a filler did not result in any significant impairment of this property.

Chemical resistance

Tests were carried out upon rectangular test pieces approximately 112×20×1.5 mm in size. Each test piece was weighed and then immersed in the appropriate acid or alkaline solution for 30 days at 60° C. Each sample was kept separate by testing each in a boiling tube, thereby avoiding the possibility of cross contamination. At the end of the 30 day period, each sample was removed, washed thoroughly with water, dried and weighed. The tests were carried out in duplicate. The percentage weight change was calculated in each case.

The acid solution was a 60% by weight aqueous solution of sulphuric acid.

The alkaline solution was a 200 g/liter solution of sodium hydroxide in water.

The results were as follows:

TABLE 6

| Formulation | % Wt. change in acid | % Wt. change in alkali |
|---|---|---|
| A | −0.03 | +0.10 |
| A | −0.01 | +0.08 |
| B | −0.03 | +0.08 |
| B | −0.02 | +0.07 |
| C | −0.02 | +0.12 |
| C | −0.01 | +0.12 |

There was no obvious change in appearance after the 30 days' immersion in acid or alkali. The weight losses in acid solution and the weight increases in alkaline solution were well within the limits stipulated in British Standard (BS) 4660: 1973, which requires that the mass of each specimen shall not change by more than 32 mg (a weight change of approximately 0.7% in the present tests).

However, the proportion of calcium carbonate in formulation B was at the value conventionally regarded as the maximum, if acid resistance is to be maintained. As is well known, calcium carbonate will react with an acid to form the corresponding calcium salt, water and carbon dioxide. Silica on the other hand, is inert to most common acids and it is therefore contemplated that the proportion of the present amorphous silica used as a filler could be substantially increased, without loss of chemical resistance.

Also, as indicated above, increased amounts of PCC result in an unacceptable increase in brittleness of the filled UPVC, whereas this is not the case with the present amorphous silica.

(IV) High loadings of Filler

From a purely technical viewpoint, it would be usually sufficient for the present amorphous silica to be used in the customary amount of 5-10 pphr. However, the desirability of using higher loadings of the present silica filler, as a means of reducing costs, has been alluded to. In fact, based on extrapolation of the results given herein, and on other results not recorded herein, it is envisaged that the present amorphous silica could be used at loadings of from 5 to 150 pphr, especially from 5 to 100 pphr, and in particular from 5 to 80 pphr.

The table which follows records the results of tests on UPVC filled with a conventional PCC filler or with the present amorphous silica at loadings of from 10 to 30 pphr.

TABLE 7

|  | D | E | F | G | H | J | K | L |
|---|---|---|---|---|---|---|---|---|
| Winnofil S (pphr) | 10 | 15 | 20 | 30 | — | — | — | — |
| Kestrel 600 (pphr) | — | — | — | — | 10 | 15 | 20 | 30 |
| 1% Modulus (N/mm$^2$) | 1589 | 1553 | 1547 | 1698 | 1505 | 1562 | 1506 | 1684 |
| Yield Stress (N/mm$^2$) | 45.4 | 43.1 | 40.4 | 37.5 | 44.8 | 41.7 | 39.9 | 38.4 |
| Yield Strain (%) | 6.1 | 6.2 | 5.4 | 3.7 | 6.3 | 6.1 | 5.3 | 5.7 |
| Break Strain (%) | 9.1 | 23.2 | 10.1 | 5.6 | 24.1 | 17.3 | 12.6 | 18.2 |
| Notched Impact value (mJ) (Sample thickness, mm) | 55 | 100 | 80 | 110 | 130 | 130 | 100 | 120 |
|  | 0.86 | 0.85 | 1.12 | 1.14 | 1.11 | 1.07 | 1.11 | 1.40 |
| Corrected Impact value (kJ/m$^2$) | 7 | 13 | 8 | 11 | 13 | 13 | 10 | 10 |
| Vicat Softening point (°C.) | 94 | 99 | 100 | 102 | 98 | 97 | 101 | 101 |

Notes:
1. The impact strength was determined on notched bars in a non-standard test procedure.
2. The corrected impact strength was calculated assuming that the impact strength is proportional to the thickness of the sample bar.
3. Variation in sample preparation may be the cause of some scatter in the results.

The significant property in the above table is the break strain, or elongation at break. This is a measure of the brittleness of the sample. In the case of the conventional filler, the PVC shows increased brittleness at higher loadings. The PVC filled with the present amorphous silica exhibits low brittleness as high filler loadings.

In a further series of experiments, rigid UPVC compositions were prepared in sheet form by substantially the same procedure used to form the samples specified in Table 7, namely high-speed mixing, mill mixing and compression moulding. However, even higher loadings of Kestrel 600 were employed. The results are given below:

TABLE 8

|  | M | N | P |
|---|---|---|---|
| Composition |  |  |  |
| Extrusion-grade PVC (Breon S125/12), parts | 100 | 100 | 100 |
| Coprecipitated stabilizer/lubricant flakes | 3 | 3 | 3 |
| Kestrel 600 | 46 | 86 | 126 |
| Results |  |  |  |
| 1% tensile modues N/mm$^2$ | 1450 | 2340 | 2350 |
| Yield Stress N/mm$^2$ | 38.2 | 51.6 | 49.7 |
| Elongation at yield (%) | 4.5 | 4.5 | — |
| Elongation at break (%) | 14.3 | 7.8 | 2.6 |
| Vicat Softening temperature, °C. | 101 | 116 | 131 |
| Specific gravity | 1.579 | 1.686 | 1.744 |

Comparison experiments with Winnofil S as the filler were redundant, as that prior-art filler cannot be used as such high loadings in good quality compositions, owing to poor mechanical properties and very low chemical resistance.

High loadings of the present amorphous silica should also improve the fire resistance of the PVC compositions.

(V) Injection Moulding

In the foregoing section, the processing involved the use of compression moulding, as this is a convenient laboratory procedure. However, injection moulding is commercially used, for example for making fittings for pipes. (It is advantageous to form pipes and the associated fittings from the same material in order to ensure uniform properties such as thermal expansion.)

The following table sets out the processing conditions for various PVC formulations. A Szekely machine was used, with a Charpy 3-bar mould.

TABLE 9

|  | IM1 | IM2 | IM3 | IM4 |
|---|---|---|---|---|
| Composition |  |  |  |  |
| PVC (Carina S55-02), parts | 2500 | 2500 | 2500 | 2500 |
| Stabilizer/Lubricant | 225 | 225 | 225 | 225 |
| Kestrel 600 | 175 | 250 | — | — |
| Winnofil S | — | — | 175 | 250 |
| Injection Unit |  |  |  |  |
| Screw cushion, mm | 3 | 3 | 3 | 3 |
| Pressure step | ←Yes, at point of fill→ | | | |
| Temperatures (°C.): |  |  |  |  |
| Barrel-front | 180 | 190 | 185 | 185 |
| middle | 170 | 180 | 175 | 175 |
| rear | 160 | 180 | 175 | 175 |
| Nozzle | 180 | 190 | 185 | 185 |
| Melt | 186 | 194 | 195 | — |
| Mould | 40 | 40 | 40 | 40 |
| Pressures, psi (line) |  |  |  |  |
| 1st stage, injection | 650 | 650 | 650 | 650 |
| 2nd stage, injection | 580 | 580 | 580 | 580 |
| Speeds |  |  |  |  |
| Injection | slow | very slow | very slow | very slow |
| Screw rotation | slow | slow | slow | slow |
| Times (minutes) |  |  |  |  |
| Injection | 20 | 20 | 20 | 20 |
| Cooling | 30 | 30 | 30 | 30 |

When compared with the prior-art compositions IM2 and IM4, the compositions of the present invention, IM1 and IM2, exhibited excellent properties, including good surface finish of the moulded products.

Investigations have indicated that the high levels of the present amorphous silica referred to above in Section (IV) can equally be used in injection moulding PVC compositions.

(IV) Pipe Extrusion

Experiments have shown that good-quality pipes can be extruded from UPVC compositions containing the present amorphous silica, provided that good mixing of the ingredients is effected. The ingredients were, in fact, subjected to high-speed mixing followed by melt mixing; the composition was then shredded to form pellets for the extrusion step.

The following table lists the components (in phr), extrusion conditions and properties of various compositions. Composition Q is for comparison purposes.

Pipe (41 mm, outside diameter) was extruded from the compositions on a Schloemann BT50-8 twin-screw extruder, using the specified die pressures, and at rates of 53 cm/min.

significantly lower the costs whilst not significantly impairing the requisite properties of the CPVC.

TABLE 10

| | Components (phr) | | | | | | | |
|---|---|---|---|---|---|---|---|---|
| Composition | PVC[1] | TBLS[2] | DBLS[3] | Ca Stearate[4] | Stearic acid[5] | Wax[6] | Winnofil S | Kestrel 600 |
| Q | 100 | 2.5 | 0.5 | 0.5 | 0.5 | — | 5 | — |
| R | 100 | 2.5 | 0.5 | 0.5 | 0.5 | — | — | 10 |
| S | 100 | 2.5 | 0.5 | 0.5 | 0.5 | — | — | 20 |
| T | 100 | 2.5 | 0.5 | 0.5 | 0.75 | 0.27 | — | 30 |
| U | 100 | 2.5 | 0.5 | 0.5 | 1.0 | 0.49 | — | 40 |
| V | 100 | 2.5 | 0.5 | 0.5 | 1.25 | 0.51 | — | 50 |
| W | 100 | 2.5 | 0.5 | 0.5 | 1.5 | 0.53 | — | 60 |
| X | 100 | 2.5 | 0.5 | 0.5 | 2.0 | 0.57 | — | 80 |

Notes
[1] Breon S110/10
[2] Tribasic lead sulphate, D grade supplied by Associated Lead Manufacturers
[3] Dibasic lead stearate, D grade supplied by Associated Lead Manufacturers
[4] Calcium stearate, D grade supplied by Associated Lead Manufacturers
[5] Distec A108, supplied by Midkem Ltd
[6] Polyethylene Wax, AC617A, supplied by Rohm & Haas (U.K.) Ltd.

Extruder conditions

| Composition | B1[1] | Ad[1] | D1[1] | D2[1] | Screw speed (rpm) | Motor current (A) | Die pressure (psi) |
|---|---|---|---|---|---|---|---|
| Q | 165 | 175 | 180 | 180 | 9 | 5.75 | 2,200 |
| R | 172 | 180 | 175 | 178 | 14 | 6.0 | 1,900 |
| S | 170 | 175 | 175 | 175 | 12 | 6.0 | 3,000 |
| T | 175 | 175 | 180 | 180 | 9 | 5.75 | 2,500 |
| U | 170 | 175 | 175 | 175 | 9 | 6.0 | 2,850 |
| V | 170 | 175 | 175 | 175 | 9 | 6.0 | 3,000 |
| W | 170 | 175 | 180 | 180 | 9 | 6.0 | 3,400 |
| X | — | — | — | — | — | — | 3,800 |

Notes
[1] B1, Ad, D1 and D2 are conventional designations for parts of the apparatus. The figures indicate the temperature in °C.

| | Properties | | |
|---|---|---|---|
| Composition | Impact test[1] | Vicat[2] | Pipe Appearance |
| Q | Fail | — | Smooth, glossy |
| R | Pass | 98 | " |
| S | Pass | 101 | " |
| T | Pass | 101 | " |
| U | Pass | 101 | " |
| V | Pass | — | " |
| W | Pass | — | " |
| X | Pass | 116 | " |

Notes
[1] 2.7 kg weight dropped from a height of 2 meters.
[2] Vicat softening point in °C.

Pipes extruded from UPVC containing the present amorphous silica as a filler can—depending on the level of silica—meet the standards required not only for lower-grades, e.g. rainwater pipes (see British Standard BS 4576), but also for higher grades, e.g. pressure pipes (see British Standard BS 3505).

In fact, it is considered that such pipes can meet the strength requirements of BS 3505 even with wall thicknesses below that specified in the said British Standard.

An advantage of pipes made from PVC compositions according to this invention is that fractures, when they do occur, are ductile rather than brittle fractures. Moreover, whereas prior-art PVC pipes cannot be threaded (they are "notch-sensitive"), the present filled PVC pipes can be threaded.

(VII) Other Applications

As noted above, high Vicat softening temperatures (above 100° C.) can be achieved with the use of the present amorphous silica as a filler in ordinary UPVC. This is a pre-requisite for pipes to be used to convey hot water.

Hot-water pipes can be fabricated from chlorinated PVC (CPVC), but this is an expensive material. The use of high loadings of the present amorphous silica should (VIII) Plasticized PVC Although the foregoing description has been concerned mainly with UPVC, it is possible to employ the present amorphous silica as a filler in plasticized PVC.

The following table shows the composition of various experimental formulations, which may be regarded as general purpose plasticized PVC formulations. In each case, the PVC employed was the above-mentioned Breon S125/12, the plasticizer employed was dioctylphthalate and the stabilizer employed was tribasic lead sulphate.

For each formulation, the ingredients were weighed and then premixed in a metal container. Melt mixing was then accomplished on an electrically heated, two-roll mill (a Planters 12-inch laboratory mill), the front roll of which was set to give a temperature of 150° C. and the back roll of which was set at 140° C.; the roll speeds were 20 rpm at the front and 18 rpm at the back. Mixing time was ten minutes. The mix containing 40 pphr of whiting was rather sticky at the mixing temperature.

Part of the hide produced by milling was then compression moulded into sheets measuring 150×150×1.5 mm using a picture frame mould. This mould was preheated to 160° C. and then a piece of compounded material was inserted and the mould was allowed to stand for a further 10 minutes in the press under light contact pressure. At the end of this period, a pressure of 0.5 tsi (4 MN/m$^2$) was applied and the press was then cooled to room temperature.

To test the tensile strength, 4 dumbbell-shaped specimens were cut from each sheet of the general purpose PVC formulation and, after measuring its thickness, each sample was tested on a Hounsfield Tensometer at a test speed of 500 mm/min at a test temperature of 23° C. The press procedure was as specified in British Standards BS 903, part A2, 1971. The results are also given in the following table:

TABLE 11

| | Formulation | | | | | | |
|---|---|---|---|---|---|---|---|
| | 1 | 2 | 3 | 4 | 5 | 6 | 7 |
| PVC | 100 | 100 | 100 | 100 | 100 | 100 | 100 |
| Kestrel 600 | — | 10 | 20 | 40 | 80 | — | — |
| Whiting | — | — | — | — | — | 20 | 40 |
| Plasticizer | 50 | 50 | 50 | 50 | 50 | 50 | 50 |
| Stabilizer | 5 | 5 | 5 | 5 | 5 | 5 | 5 |
| Tensile strength (Nmm$^{-2}$) | 15.1 | 19.7 | 21.1 | 18.4 | 19.4 | 19.7 | 17.2 |

The remarkable result is that the addition of comparatively large quantities of the present amorphous silica caused no loss of tensile strength.

The formulations containing the present amorphous silica, even at 80 pphr, produced sheets with a smooth, shiny appearance.

Of course, analogously to the UPVC, the plasticized PVC can accept even higher levels of the present amorphous silica filler. The use of lower-than-usual amounts of plasticizer is also contemplated.

(IX) Mixtures of Fillers

It will be understood that the skilled processer may use the present amorphous silica in admixture with one or more other fillers in order to achieve a required balance of characteristics in the finished PVC.

Also, as indicated above, the present amorphous silica can be used with customary processing aids, for example stearic acid (as a coating for the particles of silica prior to blending), Paraloid K120N or K175 (Rohm and Haas), stabilizers, waxes and the like.

In a preferred embodiment, the present amorphous silica is first treated with a silane, e.g. an amino-silane, such as Union Carbide's A-1100. Alternatively, the silane can be incorporated into the composition of resin and silica. The addition of a silane may further improve the mechanical properties of the composition.

(X) Thermoplastic Elastomer Resins (a) Uneprenes-polyolefin thermoplastic elastomers Thermoplastic elastomers or TPR's (thermoplastic rubbers), as they are often called, lie in a growing and very important area between true plastics and true rubbers. Briefly, they are processed as normal thermoplastics at the temperatures employed in such operations as injection moulding and extrusion. At ambient temperatures they give a strong rubbery material. No permanent irreversible or chemical vulcanisation process is involved and another great advantage is that material can be re-used, e.g. scrap or waste material is usable. In the case of traditional rubbers, vulcanisation involves a non-reversible transition from plastic to elastic conditions and any waste or scrap during processing at this stage is unusable.

In general, TPR's are more expensive than standard rubber or standard plastics. For this reason, any filler or extender which gives to a final compound a price advantage without impairing properties is important. In TPR of the Uneprene type, the present amorphous silica exhibits reinforcing properties and increases the tensile strength at 10 and 20 parts in both Uneprene 720 and Uneprene 910. The value of the elongation at break also increases. It appears that the effect is more marked in the case of the softer, more elastomeric Uneprene 720 compared with the harder, more plastic Uneprene 910. The presence of the elastomeric component is possibly of importance in obtaining the reinforcement. The harder Uneprene 910 also has a higher level of polypropylene present in the blend.

When increasing the loading of the present amorphous silica beyond 20 phr, it is advantageous to add a small amount of processing oil. Compound No. 38 in the following table shows the results of Uneprene 710 with 30 parts of Kestrel 600 and 5 parts of oil. Here, the tensile strength of the original virgin material is still maintained even with the considerable quantity of extender (silica plus oil) present.

The overall result of tests of the present silica in Uneprene is that it is a promising extender, especially for the softer elastomeric grades, since these are more expensive than the harder grades. Softer grades contain more of the expensive EPDM rubber and the harder grades have higher proportions of polypropylene which is currently relatively cheap. On a weight basis, the silica is less expensive than polypropylene.

A possible use of the silica-extended thermoplastic rubbers of the softer type is in, for example, window seals.

The results of tests of silica-filled Uneprenes are given in Table 12, which follows.

TABLE 12

| Compound No. | Uneprene | Kestrel 600 phr | Moduli at Elongation | | | | | | Yield | | Ultimate tensile strength | | Elongation at break (%) |
|---|---|---|---|---|---|---|---|---|---|---|---|---|---|
| | | | 100% | | 200% | | 300% | | | | | | |
| | | | kg/cm$^2$ | psi | kg/cm$^2$ | psi | kg/cm$^2$ | psi | kg/cm$^2$ | psi | kg/cm$^2$ | psi | |
| 35 | 720 | — | 38.6 | 550 | 50.4 | 715 | 64.2 | 910 | — | — | 85.9 | 1220 | 520 |
| 36 | 720 | 10 | 43.1 | 610 | 55.2 | 780 | 68.2 | 970 | — | — | 114 | 1620 | 510 |
| 37 | 720 | 20 | 40.2 | 570 | 49.7 | 705 | 60.8 | 860 | — | — | 118 | 1680 | 550 |
| 38 | 720 | 30 (5 Oil) | 27.2 | 390 | 35.5 | 505 | 44.0 | 625 | — | — | 89 | 1260 | 640 |
| 39 | 910 | — | 104 | 1480 | 107 | 1520 | 113 | 1600 | 104 | 1480 | 133 | 1890 | 420 |
| 40 | 910 | 10 | 84.8 | 1200 | 88.5 | 1255 | 95.6 | 1360 | 84.8 | 1200 | 155 | 2200 | 510 |
| 41 | 910 | 20 | 86.6 | 1230 | 91.6 | 1300 | 97.0 | 1380 | 87.4 | 1240 | 159 | 2260 | 540 |

(b) Styrene-butadiene-styrene (SBS) thermoplastic elastomers

The formulations studied were based upon Shell Cariflex 1101 Thermoplastic Elastomer (a three block copolymer having poly(styrene) end blocks and a poly(butadiene) central block). In one series this elastomer was compounded directly with a high viscosity aromatic oil (Shell Duplex 929) and Kestrel 600. In a second series the elastomer was precompounded with varying amounts of homo poly(styrene) (Crystal Poly(styrene), M.W.=150,000, from Shell). In all mixes the Kestrel 600 was used untreated. A Brabender internal mixer was used at 160° C. for the compounding operations. The materials were compression moulded into sheets from which standard test pieces were cut about 24 hours aging. Table 13 below gives details of the formulations tested.

TABLE 13

SBS/Kestrel 600 Formulations Tested

SERIES 1

| Code No. | Parts SBS | Parts Kestrel 600 | Parts Oil | |
|---|---|---|---|---|
| 50/10 | 100 | 50 | 10 | |
| 50/20 | 100 | 50 | 20 | |
| 100/20 | 100 | 100 | 20 | |
| 100/30 | 100 | 100 | 30 | |
| 150/30 | 100 | 150 | 30 | |
| 200/50 | 100 | 200 | 50 | |
| 200/80 | 100 | 200 | 80 | |
| 250/80 | 100 | 250 | 80 | |
| 250/100 | 100 | 250 | 100 | |

SERIES 2

| Code No. | Parts SBS | Parts Kestrel 600 | Parts Oil | Parts Polystyrene |
|---|---|---|---|---|
| 100/50/30 | 100 | 100 | 30 | 50 |
| 100/50/50 | 100 | 150 | 50 | 50 |

Stress-strain data were obtained on a J. J. Tensometer at a cross head speed of 500 mm/min (strain rate 1000%/min.) Other physical tests were performed according to British Standards specifications except where otherwise stated.

A summary of principal results is given in Table 14 below.

TABLE 14

| Composition | Hardness IRHD | Relative Abrasion Resistance | Comp Set | Tensile Strength MPa | 100% Mod MPa | 200% Mod MPa | Elongation at break % |
|---|---|---|---|---|---|---|---|
| 50/10 | 82* | — | 26 | 8.7 | — | — | 1055 |
| 50/20 | 80* | — | 28 | 6.5 | — | — | 1410 |
| 100/20 | 85* | — | 24 | 6.5 | — | — | 1130 |
| 100/30 | 83 | 9 | 30 | 7.0 | 2.1 | 3.1 | 700 |
| 150/30 | 76 | 8 | 32 | 5.7 | 1.9 | 2.9 | 900 |
| 200/50 | 82 | 8 | 38 | 5.2 | 2.3 | 3.3 | 825 |
| 200/80 | 68 | 7 | 41 | 3.9 | 1.5 | 1.9 | 1100 |
| 250/80 | 87 | 6 | 40 | 4.3 | 2.2 | 2.9 | 975 |
| 250/100 | 69 | 7 | 42 | 4.3 | 1.1 | 1.1 | 1100 |
| $\frac{100}{50}$/30 | 88 | 10 | 21 | 7.8 | 4.3 | 6.3 | 425 |
| $\frac{150}{50}$/50 | 94 | 10 | 35 | 6.0 | 3.9 | 5.2 | 390 |

*Apparent Hardness non-standard test pieces

Discussion of Experimental Data (i) Ultimate Properties.

All The Kestrel 600 filled materials show good elongation to break, but at the higher filler loadings the specimens tended towards plasticity rather than elasticity at high elongations. Good ultimate strengths are exhibited up to 200 pph Kestrel 600 provided the extending oil level is not too high. An improvement in tensile strength is achieved by blending poly(styrene) but this occurs because the modulus has been increased and the elongation reduced.

(ii) Compression Set.

This increases gradually with increasing filler loading, but could be considered acceptable for many purposes, such as shoe soling applications, up to 150 pph and up to 200 pph for less critical applications such as car bumpers or low strain (<20%) applications where the materials tend to show a small yield phenomenon.

(iii) Modulus and Hardness.

A remarkable feature of Kestrel 600 as a filler in SBS is the minimal increase in modulus or hardness which results. For examle at 200 pph filler/50 pph oil the 100% modulus is still only 2.3 MPa (=MN/m$^2$) compared to the original unfilled SBS whose 100% modulus is 1.0 MPa. A rubber-like stiffness and hardness can thus be achieved by correct formulation even up to 250% filler, although possibly with some sacrifice in hysteresis and compression set.

(iv) Hysteresis.

This parameter was not extracted in a quantitative manner although the information was available in the loop area of cyclic stress-strain graphs. At 150 pph the hysteresis was relatively high especially in the poly(styrene) compounded samples. The level of creep and hysteresis will depend on the strain level at which the material is to be used.

There was a stress softening in the first cycle of all the samples, although this is a feature of this type of thermoelastomer.

(v) Abrasion Resistance.

This was measured on a relative scale and for rubber-like materials remained quite good up to the 200/50 sample. It was improved by blending in poly(styrene) but this was really because the modulus had been increased. The level of abrasion resistance should be acceptable for various applications, e.g. for some shoe soling applications.

(vi) Processability.

The materials were easily mixed and moulded at moderate temperatures (160° C.). No difficulties were experienced even at the highest filler loadings.

In brief, then, the addition of the present amorphous silica to SBS thermoelastomers produces tough, highly extensible thermoplastic elastomers even up to 250 pph of filler loading (based on 100 parts rubber). For applications where compression set, hysteresis and abrasion are critical 150 pph of the silica filler represents a reasonable upper limit. Increase in modulus and abrasion resistance can be achieved, for example, by incorporation of 50 pph of crystal poly(styrene).

Possible uses of these thermoplastic elastomers are in footwear, car bumpers, protective rubber coatings, non-critical hose applications and electrical wiring (depending on the water sensitivity of the particular blend).

We claim:

1. A solid resin composition suitable for forming into artifacts, characterised in that it contains a thermoplastic polyvinyl chloride resin and, as a filler, particulate amorphous silica, which silica is obtained by a process in which silica is reduced and the reduction product is oxidised in the vapour phase to form silica.

2. A composition according to claim 1, characterised in that the silica is obtained by a process in which silica is reduced with carbon and the reduction product is oxidised in the vapour phase with air.

3. A composition according to claim 1, characterised in that the particulate amorphous silica is obtained as a by-product in the production of silicon metal or ferrosilicon in a reduction furnace.

4. A composition according to claim 3, characterised in that any carbon content of the silica so obtained is burnt off to lighten the colour of the silica.

5. A composition according to claim 1, characterised in that the particulate amorphous silica has a specific surface area not greater than 22 m$^2$/g.

6. A composition according to claim 5, characterised in that the said particulate amorphous silica consists of at least 86% by weight of SiO$_2$ and has a real density of 2.20–2.25 g/cm$^3$ and a specific surface area of 18–22 m$^2$/g, the particles being substantially spherical and at least 60% by weight of the particles having a particle size of less than 1 micron.

7. A composition according to claim 1, characterised in that the particulate amorphous silica is present in an amount of from 5 to 250 parts per 100 parts of resin.

8. A composition according to claim 7, characterised in that the particulate amorphous silica is present in an amount greater than 10 parts per 100 parts of resin.

9. A composition according to claim 7, characterised in that the particulate amorphous silica is present in an amount of from 5 to 150 parts per 100 parts of resin.

10. A composition according to claim 9, characterised in that the particulate amorphous silica is present in an amount of from 5 to 100 parts per 100 parts of resin.

11. A composition according to claim 10, characterised in that the particulate amorphous silica is present in an amount of from 5 to 80 parts per 100 parts of resin.

12. A composition according to claim 11 wherein the particulate amorphous silica is present in an amount of 5 to 30 parts per 100 parts of resin.

13. A composition according to claim 12 wherein the particulate amorphous silica is preent in an amount of 10 to 30 parts per 100 parts of resin.

14. A composition according to claim 1, characterised in that the polyvinyl chloride is rigid and unplasticized.

15. A composition according to claim 1 wherein the particulate amorphous silica is present in an amount of 10 to 150 parts per 100 parts of resin.

16. A composition according to claim 15 wherein said silica is present in an amount of 10 to 80 parts per 100 parts of resin.

17. A composition according to claim 16 wherein said resin is present in an amount of 30 to 80 parts per 100 parts of resin.

18. A composition according to claim 15 wherein said silica is present in an amount of 46 to 126 parts per 100 parts of resin.

19. A solid resin composition according to claim 1 wherein the amorphous silica is the sole filler.

20. A composition according to claim 1 wherein the amorphous slilica has a specific surface area of 18–22 m$^2$/g.

* * * * *